United States Patent [19]

Schalk

[11] 4,132,930
[45] Jan. 2, 1979

[54] BRUSHLESS D-C MOTOR WITH SEVERAL Y CONNECTED PHASE WINDINGS

[75] Inventor: Karl Schalk, Nuremberg, Germany

[73] Assignee: Siemens Aktiengesellschaft, Munich, Germany

[21] Appl. No.: 833,354

[22] Filed: Sep. 14, 1977

[30] Foreign Application Priority Data

Sep. 21, 1976 [DE] Fed. Rep. of Germany ....... 2642472

[51] Int. Cl.² ............................................. H02K 29/00
[52] U.S. Cl. ...................................... 318/138; 318/254
[58] Field of Search ................................ 318/138, 254

[56] References Cited
U.S. PATENT DOCUMENTS

| | | | |
|---|---|---|---|
| 3,688,172 | 8/1972 | Sieber et al. | 318/254 |
| 3,831,073 | 8/1974 | Tanikoshi | 318/254 |
| 3,891,904 | 6/1975 | Pollmeier | 318/138 X |
| 3,916,272 | 10/1975 | Grünleitner | 318/138 |
| 3,942,083 | 3/1976 | Takahashi et al. | 318/138 |
| 4,023,082 | 5/1977 | Tanikoshi | 318/254 X |

*Primary Examiner*—Gene Z. Rubinson
*Attorney, Agent, or Firm*—Kenyon & Kenyon, Reilly, Carr & Chapin

[57] ABSTRACT

For compensating the load dependence of the actual speed value in brushless d-c motors, a current pulse, by which a defined discharge of the smoothing capacitor is effected, is picked up by means of a shunt resistor and a diode.

7 Claims, 5 Drawing Figures

BRUSHLESS D-C MOTOR WITH SEVERAL Y CONNECTED PHASE WINDINGS

BACKGROUND OF THE INVENTION

This invention relates to brushless d-c motors in general, and more particularly to such a motor having improved performance.

Brushless d-c motors with several Y connected phase windings, which can be connected to a d-c voltage source via a commutation arrangement consisting of controlled semiconductor elements, with each phase winding having its winding end which is connected to the controlled semiconductor element connected to the one terminal of a pickup diode and the pickup diodes having their other terminals connected to a common tie point, are known. In order to prevent, on the one hand, destruction of the controlled semiconductor elements of the commutation arrangement by the self-induction voltage occurring when the individual phase windings are switched off, and to counteract, on the other hand, falsification of the actual speed value by this self-induction voltage, a voltage-dependent element has its one terminal connected to the common tie point of the pickup diodes and its other terminal connected, via a series resistor, to the neutral point of the phase windings. The load circuit of a controlled semiconductor switching element is shunted across the voltage-dependent element and the series resistor, and the actual speed value is taken off via a smoothing member consisting of at least a resistor and a capacitor between the neutral point and the common tie point of the pickup diodes.

It has been found that particularly in motors with a slotted stator, motor current dependent components are superimposed on the speed-proportional e.m.f. which is picked up via the diodes. This results in a load dependent speed error for the drive, which falsifies the actual speed value.

SUMMARY OF THE INVENTION

It is an object of the present invention to further develop a brushless d-c motor of the type mentioned at the outset in such a manner that not only is destruction of the controlled semiconductor element of the commutation arrangement by the self-induction voltage prevented, but that the load dependence of the actual speed value is also appropriately taken into account.

According to one embodiment of the present invention, the stated problem is solved by using a Darlington transistor as the controlled semiconductor element, and shunting the emitter-base path of a further transistor via a parallel resistor across the resistor connected in series with the voltage dependent element, with the collector of the further transistor tied to zero potential via a diode, connected in the forward direction, and a series resistor in such a manner that a speed proportional current pulse can be picked up at the junction point between the diode and the resistor.

This speed dependent and load dependent current pulse is either utilized for compensating the load dependent speed error of the drive or is used by itself for forming an actual speed value which takes the motor current into consideration.

The compensation of the load dependent speed error can be accomplished in a simple manner by using a Zener diode as the resistor connected in series with the diode connected in the forward direction and connecting the junction point between those two elements to the base of a further transistor, the emitter of which is tied to zero potential via a resistor and the collector of which is tied to one pole of the capacitor of the smoothing member.

Another advantageous solution of the same problem consists in connecting the junction point between the diode connected in the forward direction and the resistor to a time delay stage, the output of which is connected to the base of a further transistor, the emitter of which is connected to zero potential via a resistor and the collector of which is connected to the one pole of the capacitor of the smoothing member. The base of the transistor is connected, on the one hand, to the positive supply voltage and, on the other hand, via a diode poled in the forward direction and a resistor, to zero potential. A current proportional to the motor current is fed into the junction point between the diode and the resistor.

As already set forth above, the pickup of the speed proportional and load porportional current pulse can also be used directly for forming the actual speed value. More specifically, this is accomplished by connecting the junction point between the forward poled diode and the resistor to the input of a time delay stage, to the output of which a smoothing member is connected for forming a digital actual speed value.

DETAILED DESCRIPTION OF THE INVENTION

Figure 1:
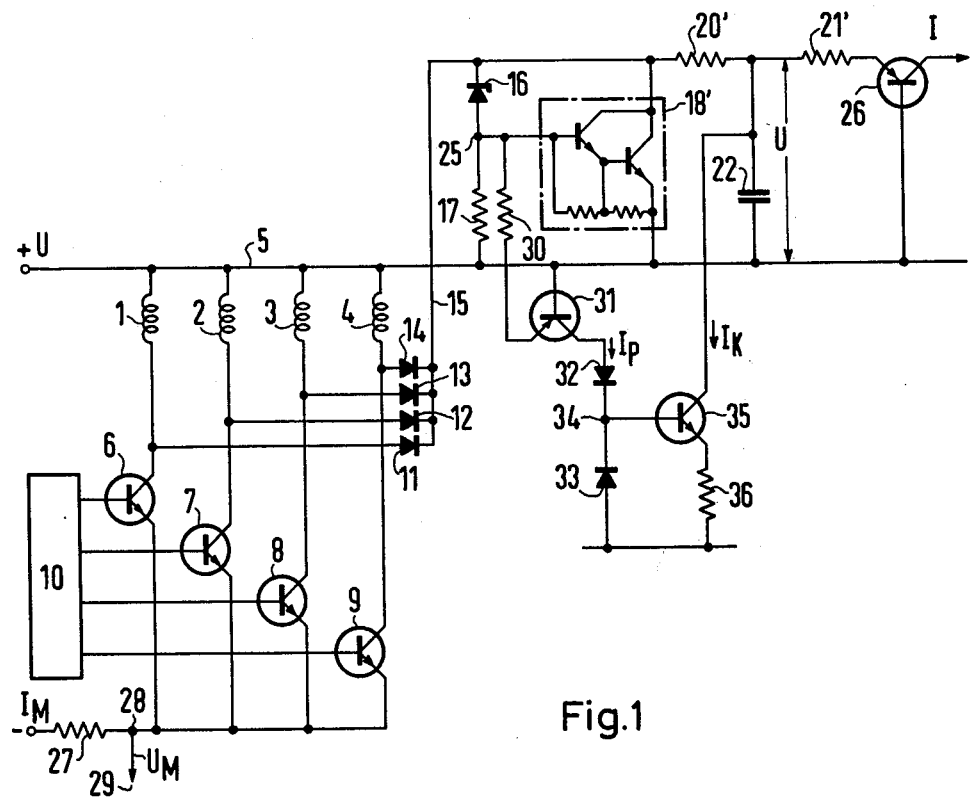
FIG. 1 is a circuit diagram of a brushless d-c motor according to the present invention.

In FIG. 1, the phase windings 1 to 4 of a brushless d-c motor are shown. One end of each of the phase windings 1 to 4 is tied to a neutral point 5. The other winding ends of the windings 1 to 4 are connected to commutation transistors 6 to 9. The commutation transistors 6 to 9 are controlled by a selection circuit 10 which is controlled in turn by a position pickup, not shown, which is influenced by the rotor of the motor. The ends of the phase windings 1 to 4, which are connected to the commutation transistor 6 to 9 are also connected respectively to one terminal of pickup diodes 11 to 14. The other terminals of these pickup diodes 11 to 14 are brought to a common tie point at line 15.

One pole of a Zener diode 16 is connected to the common line 15 and the other to the neutral point 5 via a series resistor 17. Between the common line 15 and the neutral point 5 a transistor 18 is further arranged as the controlled switching element. Transistor 18 is a Darlington transistor. As is well known, such a transistor consists of two ordinary transistors in cascade. The base of the Darlington transistor 18 is connected to the common junction point 25 of the series resistor 17 and the Zener diode 16. The acutal speed value can be taken off as the voltage $U_{ist}$ via a smoothing member consisting of resistors 20' and 21' and a capacitor 22. For converting this acutal value into a current $I_{ist}$ proportional to the latter, a transistor 26 can be used in a manner known per se. There is further provided in the common lead of the commutation transistors 6 to 9 an ohmic resistor 27, at which, from point 28, a voltage $U_M$ proportional to the motor current $I_M$ is taken off, as indicated by an arrow 29.

The base-emitter path of a further transistor 31 is shunted via a resistor 30 across the resistor 17 or the base-emitter path of the Darlington transistor 18'. The collector of the transistor 31 is connected to zero potential via a diode 32 and a Zener diode 33. The junction point 34 between the forward poled diode 32 and the Zener diode 33 is connected to the base of a transistor 35, the collector of which is connected to the one pole of the smoothing capacitor 22, and the emitter of which is connected via a resistor 36 to zero potential.

Figure 2:
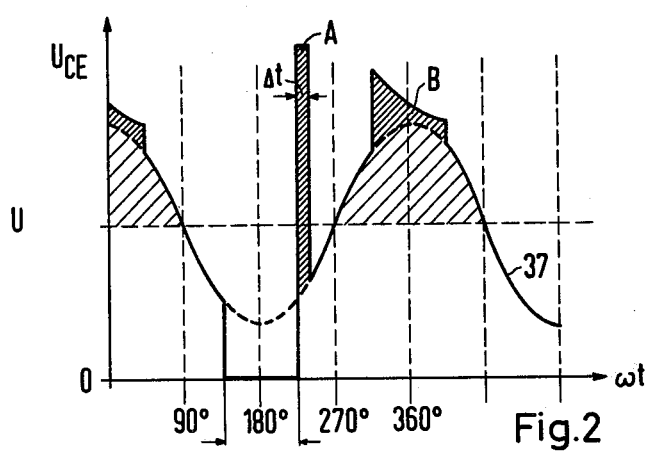
FIG. 2 is a voltage-vs-time diagram of the voltages induced in a phase winding.

The operation of the circuit of FIG. 1 is explained in detail in FIG. 2. The abscissa axis corresponds to zero potential which corresponds to the negative pole of the voltage source. A dashed line designates the potential of the neutral point 5, $U_{stern}$. A sine curve 37 represents the voltage which the rotor magnet, magnetized with two poles, induces one of the phase windings, e.g., the phase winding 1, provided this winding does not carry current. In the chosen embodiment, this winding conducts current between the angles 135° and 225° (for 90° conduction of the individual phase windings). Because of the diodes 11 to 14, however, only the half-wave positive relative to $U_{stern}$ is picked up, as indicated by the shading. As FIG. 2 shows, however, there are superimposed on this winding voltage (e.m.f.) the switching-off voltage peak A and a transformed component B from the phase winding 3, which is shifted 180° el. The magnitude of the switching-off voltage peak A is limited as to height by the Zener diode 16. The two quantities A and B are proportional to the motor current $I_M$. The pulse width $\Delta t$ also depends on the motor current, the demagnetization voltage being constant. The mean value of the two interference quantities furthermore depends on the motor speed.

FIG. 1 now shows a compensating circuit which has an output proportional to the motor current as well as to the motor speed. This is achieved by coupling a current pulse $I_P$ out via the additional resistor 30 and the transistor 31 when the Zener diode 16 responds. The pulse width $\Delta t$ is proportional to the motor current $I_M$, while the pulse frequency is dependent on the motor speed n. At the Zener diode 33, a voltage pulse of constant amplitude appears, which switches the transistor 35 into conduction so that a compensating current $I_K$ which depends on the size of the resistance 36 flows from the more positive pole of the smoothing capacitor 22. Thus, the charge of the smoothing capacitor 22 is reduced by an amount which is proportional to the product $I_K \times \Delta t$. Through appropriate choice of the resistance of 36, the effect of the two interference quantities A and B can therefore be cancelled exactly.

Figure 3:
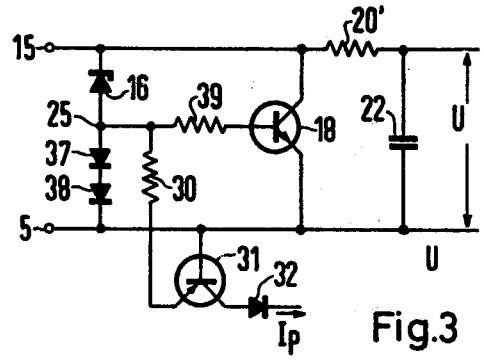
FIG. 3 is a variant of the circuit of the brushless d-c motor shown in FIG. 1.

In the embodiment of FIG. 3, the Darlington transistor 18' according to FIG. 1 is replaced by a simple transistor 18. In that case, however, the resistor 17 must be replaced by two diodes 37 and 38 and the base of the transistor 18 must be connected to the junction point 25 via a resistor 39. Only in this manner can the potential of the junction point 25 be set high enough so that an appropriate current pulse $I_P$ can be picked up via the resistor 30, transistor 31 and diode 32. The compensation of the load dependent speed error is then accomplished in the same manner as in the embodiment of FIG. 1.

In the embodiment of FIGS. 1 and 3, the height of the current pulse is determined by the Zener diode 33, while the pulse width $\Delta t$ is proportional to the motor current $I_M$.

Figure 4:
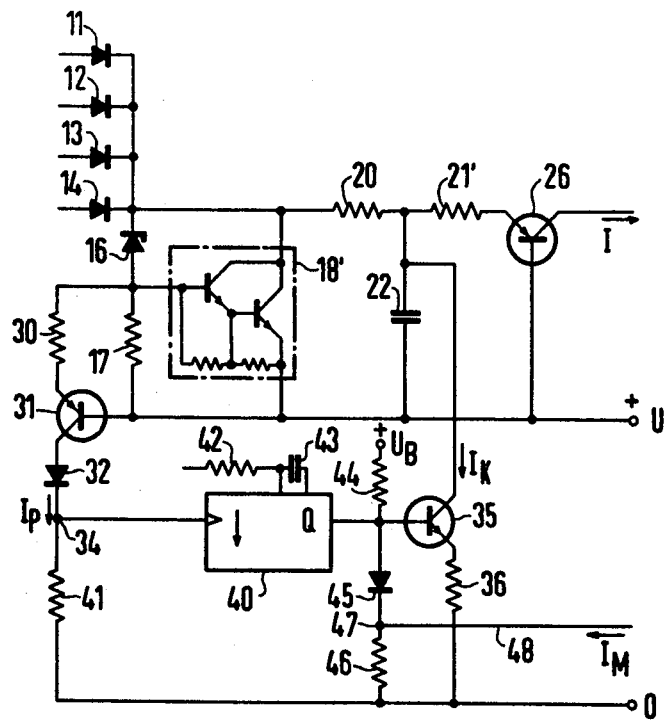
FIG. 4 is a detailed circuit diagram of the actual speed value pickup and compensation of the load dependent speed error.

In FIG. 4, an embodiment is shown, in which the pulse width $\Delta t$ of the current pulse picked up is kept constant by means of a time delay stage 40 while the pulse height is made proportional to the motor current $I_M$. Parts with the same function are labelled with the sme reference symbols as in FIG. 1. An ohmic resistor 41 can now be used in lieu of the Zener diode 33. The junction point 34 between this resistor 41 and the diode 32 is not connected directly to the base of the transistor 35 but via said time delay stage 40, e.g., a one shot multivibrator, the delay time of which can be determined in a manner know per se by a resistor 42 and a capacitor 43. The output Q of the time delay stage 40 is connected to the base of the transistor 35. The time delay stage 40 therefore responds to each pick up, speed-proportional current pulse $I_P$ and drives the transistor 35. The potentional of the base of the transistor 35 is influenced in dependence on the motor current $I_M$ and specifically by the fact that the base of the transistor 35 is connected on the one hand to the positive pole of the supply voltage $U_B$ via a resistor 44 and, on the other hand, to zero potential via a diode 45 and an ohmic resistor 46. The junction point 47 between the diode 45 and the resistor 46 is connected to a line 48, via which a current proportional to the motor current $I_M$ is fed in. The latter flows through the resistor 46 and thereby raises the potential of the junction point 47 accordingly. The diode 45 is used only to compensate the base-emitter diode drop of the transistor 35. The diode 45 receives current from the supply voltage source $U_B$, via the resistor 41, which also flows through the resistor 46. However, this current through the resistor 46 is negligibly small as compared to the motor current $I_M$, so that the voltage dropping across the resistor 46, for all practical purposes, is determined by the current proportional to the motor current $I_M$ alone. The collector current of the transistor 35 is therefore also proportional to the motor current $I_M$. The mean value of the collector current depends on the motor speed. Through appropriate choice of the resistance of 36, the value of compensating current $I_K$, which reduces the charge of the smoothing capacitor 22, as in the embodiment according to FIG. 1, can therefore be predetermined.

Figure 5:
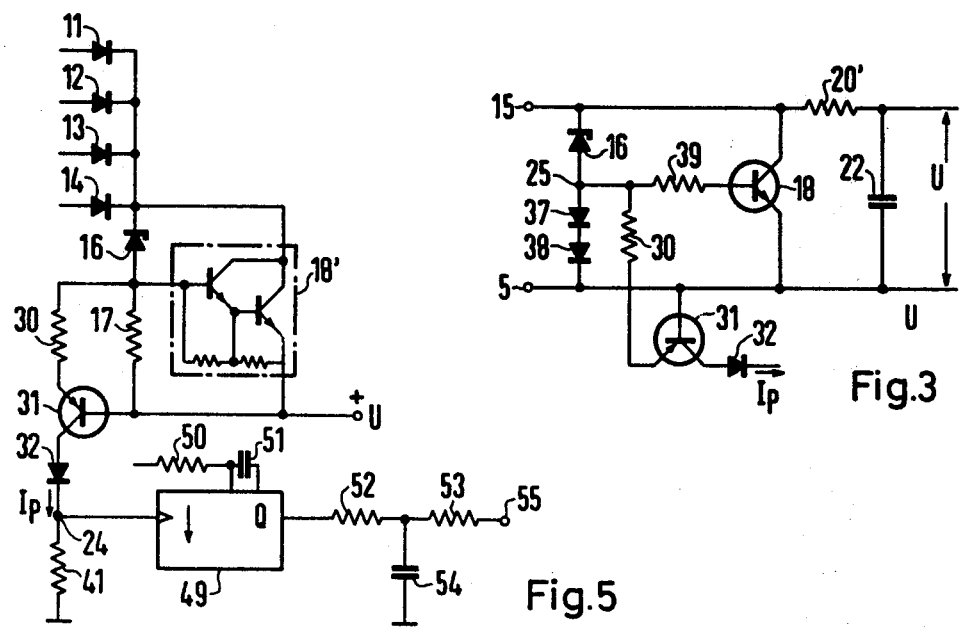
FIG. 5 is a detailed circuit diagram of a digital actual speed value pickup.

FIG. 5 shows an embodiment for obtaining a signal proportional to the actual speed value. The speed proportional current pulse $I_P$ is picked up as in the previous embodiments via the resistor 30 and the transistor 31 shunted across the resistor 17. As in the embodiment of FIG. 4, the junction point 34 between the diode 32 and the ohmic resistor 41 is connected to the input of a time delay stage 49, the time delay of which is determined by an ohmic resistor 50 and the capacitor 51. The output Q of the time delay stage 49 is connected via smoothing means consisting of the resistors 52 and 53 as well as the capacitor 54, to an output 55 which carries a voltage proportional to the actual speed value $n_{ist}$.

I claim:

1. In a brushless d-c motor with several Y connected phase windings which are coupled to a d-c source through a commutating arrangement including controlled semiconductor elements, each phase having one end coupled to a controlled semiconductor element and to one terminal of a pickup diode, the pickup diodes having their other terminals coupled to a common tie point, a voltage dependent element having one terminal coupled to the common tie point and another terminal coupled through a series resistor to a neutral point, the load circuit of a controlled semiconductor switching element being shunted across the voltage dependent element and the series resistance with the actual speed value taken off through a smoothing member including at least a resistor and a capacitor, the improvement comprising:

(a) a first additional transistor having its base coupled to the neutral point;

(b) a first resistor coupling the junction point between the voltage dependent element and series resistor to the emitter of said first additional transistor; and (c) a forward biased diode and series resistance coupling the collector of said first additional transistor to ground whereby a speed proportional current pulse can be picked up at the junction point between said diode and said series resistance.

2. The improvement according to claim 1 wherein said controlled semiconductor switching element shunted across the voltage dependent element and series resistor comprises a Darlington transistor.

3. The improvement according to claim 2 wherein said resistance in series with said forward biased diode comprises a Zener diode and further including a second additional transistor having its base connected to the junction point between said forward biased diode and said Zener diode, a second resistor coupling the emitter of said transistor to ground, the collector of said transistor coupled to one pole of the capacitor of the smoothing member.

4. The improvement according to claim 1 wherein said controlled semiconductor switching element shunted across the voltage dependent element and series resistor comprises a conventional transistor and wherein the resistance coupled in series with said voltage dependent element comprises two diodes coupled in series.

5. The improvement according to claim 4 wherein said resistance in series with said forward biased diode comprises a Zener diode and further including a second additional transistor having its base connected to the junction point between said forward poled diode and said Zener diode, a second resistor coupling the emitter of said transistor to ground, the collector of said transistor coupled to one pole of the capacitor of the smoothing member.

6. The improvement according to claim 1 and further including a second additional transistor having its collector coupled to one pole of the capacitor of the smoothing member; time delay means coupling the junction point between said forward biased diode and said resistance to the base of said transistor; a second resistor coupling the emitter of said second additional transistor to ground; a third resistor coupling the base of said transistor to the positive supply voltage; a series diode and fourth resistor coupling said base to ground; and an input connection at the junction of said diode and fourth resistor for coupling in a current proportional to the motor current.

7. The improvement according to claim 1 and further including:

(a) smoothing means; and (b) time delay means coupling the junction between said forward biased diode and said resistance to the input of said smoothing means whereby a digital actual speed value may be obtained at the output of said smoothing means.

* * * * *